United States Patent
Chachra et al.

(10) Patent No.: US 9,110,941 B2
(45) Date of Patent: Aug. 18, 2015

(54) MASTER DATA GOVERNANCE PROCESS DRIVEN BY SOURCE DATA ACCURACY METRIC

(71) Applicant: International Business Machines Corporation, Armonk, NY (US)

(72) Inventors: Upwan Chachra, Chicago, IL (US); James B. Cushman, II, Raleigh, NC (US); Lawrence Dubov, East Windsor, NJ (US); Erik Hume Jones, Phoenix, AZ (US); Shettigar Parkala Srinivas, Bangalore (IN); Scott Schumacher, Porter Ranch, CA (US); Puneet Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 13/840,826

(22) Filed: Mar. 15, 2013

(65) Prior Publication Data

US 2014/0279947 A1    Sep. 18, 2014

(51) Int. Cl.
*G06F 7/00*     (2006.01)
*G06F 17/00*    (2006.01)
*G06F 17/30*    (2006.01)

(52) U.S. Cl.
CPC .... *G06F 17/30371* (2013.01); *G06F 17/30303* (2013.01)

(58) Field of Classification Search
CPC ................................................. G06F 17/30303
USPC .......................................................... 707/692
See application file for complete search history.

(56) References Cited

U.S. PATENT DOCUMENTS

| | | | |
|---|---|---|---|
| 7,281,001 B2* | 10/2007 | Caulfield et al. | 1/1 |
| 7,801,760 B2 | 9/2010 | Handel et al. | |
| 2002/0073099 A1* | 6/2002 | Gilbert et al. | 707/104.1 |
| 2003/0046138 A1 | 3/2003 | Cary et al. | |
| 2007/0299697 A1* | 12/2007 | Friedlander et al. | 705/3 |
| 2008/0319983 A1* | 12/2008 | Meadows | 707/5 |
| 2009/0182780 A1* | 7/2009 | Wong et al. | 707/200 |
| 2011/0071979 A1* | 3/2011 | Tahiliani et al. | 707/600 |
| 2012/0072464 A1* | 3/2012 | Cohen | 707/803 |
| 2012/0084325 A1* | 4/2012 | Bansode et al. | 707/792 |
| 2012/0290543 A1* | 11/2012 | Duvvoori et al. | 707/687 |

OTHER PUBLICATIONS

Wolter et al. "The What, Why, and How of Master Data Management." MSDN. © 2008 Microsoft Corporation. 9 pages.*

(Continued)

*Primary Examiner* — Charles Lu
(74) *Attorney, Agent, or Firm* — Gates & Cooper LLP

(57) ABSTRACT

A method, apparatus, and computer program product for processing data is disclosed. In one aspect of the invention, a computer implemented method comprises receiving, on one or more computers, a record having one or more attributes from a source system. The method also comprises measuring, on one or more computers, a data accuracy of the received record as compared to a golden record stored in a master data management system. One or more remediation actions are performed, on one or more computers, to enforce improvements to the measured data accuracy of the received record in the source system. In one or more embodiments, measurement of data accuracy comprises calculating, on one or more computers, an accuracy score defined by a closeness of the received record to the golden record.

14 Claims, 13 Drawing Sheets

SOURCE-TO-GOLDEN RECORD QUALITY COMPARISON

| GOLDEN RECORD | | SOURCE RECORD | SOURCE-TO-GOLDEN COMPARISON SCORE | SOURCE ACCURACY% |
|---|---|---|---|---|
| WILLIAM SMITH | EXACT MATCH | WILLIAM SMITH | 3.0 | 100 |
| | EQUIVALENCY, INITIAL | B. SMITH | 2.4 | 80 |
| | CHARACTER OFF | WILLIAM SMYTH | 2.2 | 73.3 |
| | ANONYMOUS/NULL | BABY GIRL | 0 | 0 |
| | INCORRECT NAME | BILL JAMES | -0.3 | -10 |

GOLDEN RECORD SELF-SCORE = 3.0

$$\text{SOURCE ACCURACY METRIC} = \frac{\text{SOURCE-TO-GOLDEN COMPARISON SCORE}}{\text{GOLDEN RECORD SELF-SCORE}} \times 100\%$$

AVERAGE ACCURACY = (100 + 80 + 73.3 + 0 - 10) / 5 = 48.66%

(56) References Cited

OTHER PUBLICATIONS

Ballard, C. et al.; "Master Data Management IBM InfoSphere Rapid Deployment Package", IBM Corporation, http://www.redbooks.ibm.com/redbooks/pdfs/sg247704.pdf, Apr. 2011.

Dubov, Lawrence, "Estimating Information Quality for a Data Element", http://www.masteringdatamanagement.com, Mar. 1, 2011.

"Record linkage", http://en.wikipedia.org/wiki/Record_linkage, Wikipedia, Oct. 6, 2012.

Ballard, C. et al.; "Master Data Management IBM InfoSphere Rapid Depoloyment Package", IBM Corporation, www.ibm.com/redbooks/sg24-7704-01 . . . Apr. 2011.

Bracht, J-B. et al.; "Smarter Modeling of IBM InfoSphere Master Data Management Solutions", IBM Corporation, www.ibm.com/redbooks/sg24-7956-00 . . . Jul. 2012.

Duby, Lawrence; "Estimated Information Quality for a Data Element", www.masteringdatamanagement.com, Mar. 1, 2011.

* cited by examiner

SOURCE-TO-GOLDEN RECORD QUALITY COMPARISON

| GOLDEN RECORD | | SOURCE RECORD | SOURCE-TO-GOLDEN COMPARISON SCORE | SOURCE ACCURACY% |
|---|---|---|---|---|
| WILLIAM SMITH | EXACT MATCH | WILLIAM SMITH | 3.0 | 100 |
| | EQUIVALENCY, INITIAL | B. SMITH | 2.4 | 80 |
| | CHARACTER OFF | WILLIAM SMYTH | 2.2 | 73.3 |
| | ANONYMOUS/NULL | BABY GIRL | 0 | 0 |
| | INCORRECT NAME | BILL JAMES | -0.3 | -10 |

GOLDEN RECORD SELF-SCORE = 3.0

SOURCE ACCURACY METRIC = $\dfrac{\text{SOURCE-TO-GOLDEN COMPARISON SCORE}}{\text{GOLDEN RECORD SELF-SCORE}} \times 100\%$

AVERAGE ACCURACY = (100 + 80 + 73.3 + 0 − 10) / 5 = 48.66%

FIG. 6

MATCHING AND COMPLETENESS SELF-SCORING

| MATCHING SCORE USED AS A RECORD SIMILARITY MEASURE | | | | |
|---|---|---|---|---|
| JOHN SMITH | 5/11/1971 | 12 MAIN ST. TRENTON, NJ | (609)123-4567 | SCORE |
| J. SMITH | 5/11/1971 | 18 MAIN STREET TRENTON, NJ | 609-123-4567 | 7.7 |

702—
704—

| SELF-SCORE (SSC) USED TO MEASURE RECORD COMPLETENESS | | | | |
|---|---|---|---|---|
| JOHN SMITH | 5/11/1971 | 12 MAIN ST. TRENTON, NJ | (609)123-4567 | SCORE |
| J. SMITH | 5/11/1971 | 18 MAIN STREET TRENTON, NJ | 609-123-4567 | 9.9 |

702—

| RECORDS WITH LESS INFORMATION SHOW LOWER SSC-COMPLETENESS | | | |
|---|---|---|---|
| B. JONES | 1/1/1900 | 7 ELK ST. EWING NJ | SCORE |
| B. JONES | 1/1/1900 | 7 ELK ST. EWING NJ | 6.2 |

| ATTRIBUTE NAME | SOURCE SYSTEM NAME | WEIGHT |
|---|---|---|
| NAME | INSURANCE APPLICATION | 1 |
| NAME | CRM APPLICATION | 1 |
| PHONE NUMBER | INSURANCE APPLICATION | 1 |
| PHONE NUMBER | CRM APPLICATION | 1 |
| E-MAIL ADDRESS | INSURANCE APPLICATION | 1 |
| E-MAIL ADDRESS | CRM APPLICATION | 1 |
| AGE | INSURANCE APPLICATION | 1 |
| AGE | CRM APPLICATION | 0.5 |

FIG. 8C

SOURCE-TO-GOLDEN ACCURACY
DETAILS REPORT

REPORT PARAMETERS:
ENTITY TYPE: ID
SOURCE: HOS
ATTRIBUTE: MOBPHONE
UPPER THRESHOLD VALUE: 96

(THIS REPORT SHOWS SOURCE-TO-GOLDEN ACCURACY AT ATTRIBUTE LEVEL)

| ENTITY ID | ATTRIBUTE CODE | MEMBER VALUE | ENTITY VALUE | MEMBER TO ENTITY SCORE | ENTITY SELF SCORE |
|---|---|---|---|---|---|
| 604 | MOBPHONE | ^808^164-9747^^^ | ^808^169-4747^^^ | 24 | 40 |
| 1101 | MOBPHONE | ^410^751-0509^^^ | ^410^715-0509^^^ | 24 | 40 |
| 1772 | MOBPHONE | ^434^984-6083^^^ | ^434^894-6083^^^ | 24 | 40 |
| 1784 | MOBPHONE | ^808^335-8475^^^ | ^808^335-4875^^^ | 24 | 40 |
| 2947 | MOBPHONE | ^517^827-3487^^^ | ^517^827-3478^^^ | 24 | 40 |
| 3437 | MOBPHONE | ^404^877-0770^^^ | ^404^870-7770^^^ | 24 | 40 |
| 3709 | MOBPHONE | ^870^250-7959^^^ | ^870^250-9759^^^ | 24 | 40 |
| 4566 | MOBPHONE | ^406^259-9467^^^ | ^406^259-4967^^^ | 24 | 40 |
| 4768 | MOBPHONE | | ^802^349-2149^^^ | 0 | 40 |

FIG. 11

MASTER DATA GOVERNANCE PROCESS DRIVEN BY SOURCE DATA ACCURACY METRIC

BACKGROUND OF THE INVENTION

The present invention relates generally to systems and methods for processing data, and in particular, to systems and methods for measuring, monitoring, and/or improving the accuracy of source system records.

SUMMARY OF THE INVENTION

The invention provided herein has a number of embodiments useful, for example, in improving data accuracy of records in a source system. According to one or more embodiments of the present invention, a method, apparatus, and computer program product are provided for measuring, validating, and remediating the accuracy of source system records.

In one aspect of the present invention, a computer implemented method is provided for processing data. The method comprises receiving, on one or more computers, a record having one or more attributes from a source system. The method also comprises measuring, on one or more computers, a data accuracy of the received record as compared to a golden record stored in a master data management system. One or more remediation actions are performed, on one or more computers, to enforce improvements to the measured data accuracy of the received record in the source system.

In one or more embodiments, measurement of data accuracy comprises calculating, on one or more computers, an accuracy score defined by a closeness of the received record to the golden record. In one exemplary implementation, the accuracy score is calculated by dividing a source-to-golden score by a golden record self-score. The source-to-golden score is computed, on one or more computers, by comparing the received record to the golden record. The golden record self-score is computed, on one or more computers, by matching the golden record on itself. In another embodiment, attributes of the received record are compared to attributes of the golden record. This takes into account synonymous values, anonymous values, and a likelihood that some attribute values are slightly different due to attribute variability. In an exemplary implementation, the accuracy score is calculated for all selected attributes. In another exemplary implementation, calculation of the accuracy score comprises customizing a definition of record accuracy by introducing relative importance weights for different attributes.

In one or more other embodiments, the computer implemented method comprises generating, on one or more computers, one or more reports on the data accuracy. In other embodiments, the computer implemented method comprises monitoring, on one or more computers, the data accuracy of the received record as compared to the golden record over a time period. In exemplary implementations, thresholds for the data accuracy are defined and a data steward for the source system is notified that the received record deviates from the golden record, so that the data steward is prompted to perform the remediation actions. In further embodiments, the computer implemented method comprises normalizing or standardizing, on one or more computers, attributes of the received record.

BRIEF DESCRIPTION OF THE DRAWINGS

Referring now to the drawings in which like reference numbers represent corresponding parts throughout:

FIG. 6 is a diagram illustrating a calculation of the accuracy score for example records;

FIG. 7 is a diagram illustrating exemplary measurements of the data accuracy of example records utilizing matching and completeness self-scoring.

FIG. 8C is a diagram illustrating relative importance weights for different attributes of exemplary source system records.

FIG. 11 is a diagram illustrating another exemplary report of the data accuracy of different attributes of sources system records.

DETAILED DESCRIPTION OF THE INVENTION

Figure 1:
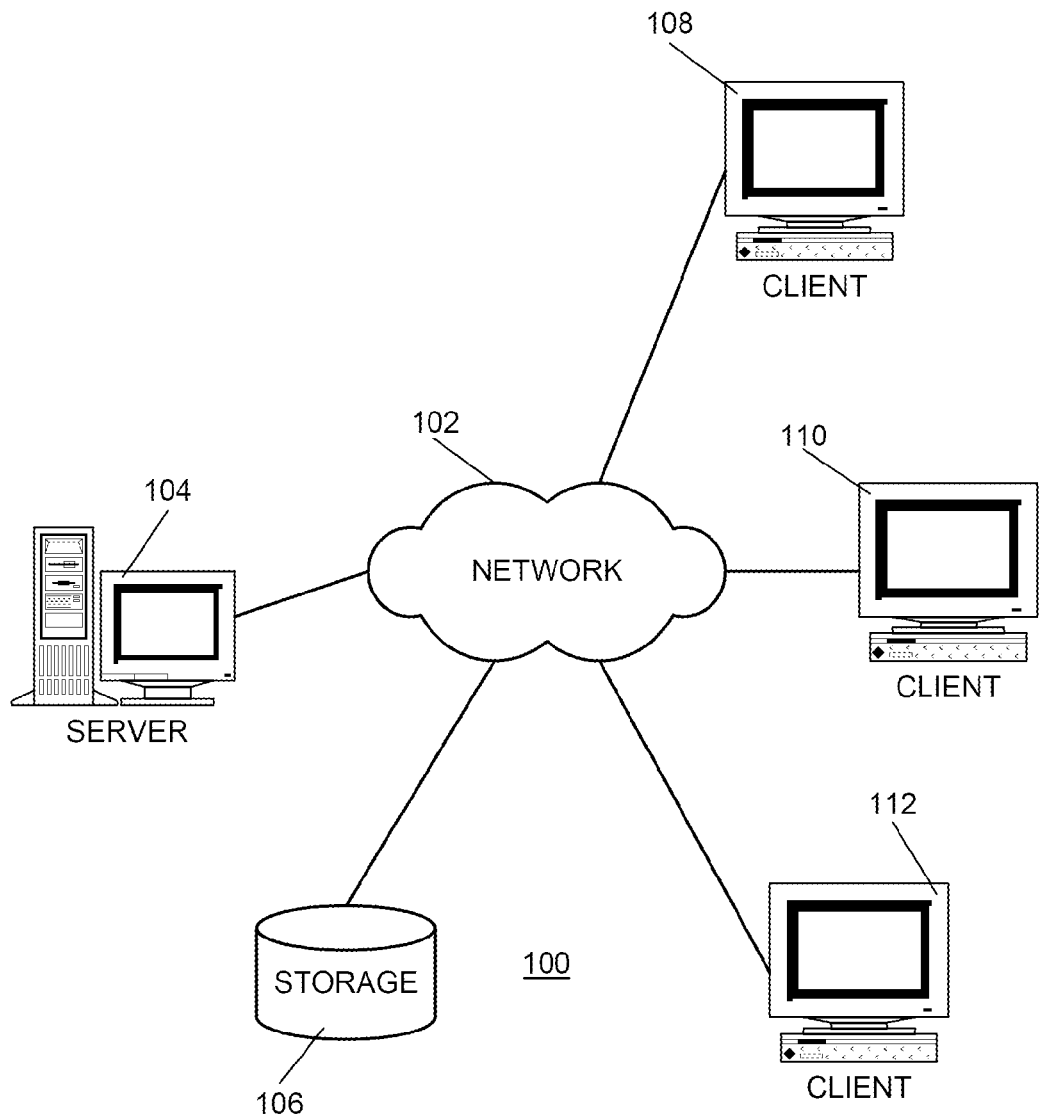
FIG. 1 is a diagram illustrating an exemplary network data processing system that can be used to implement elements of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
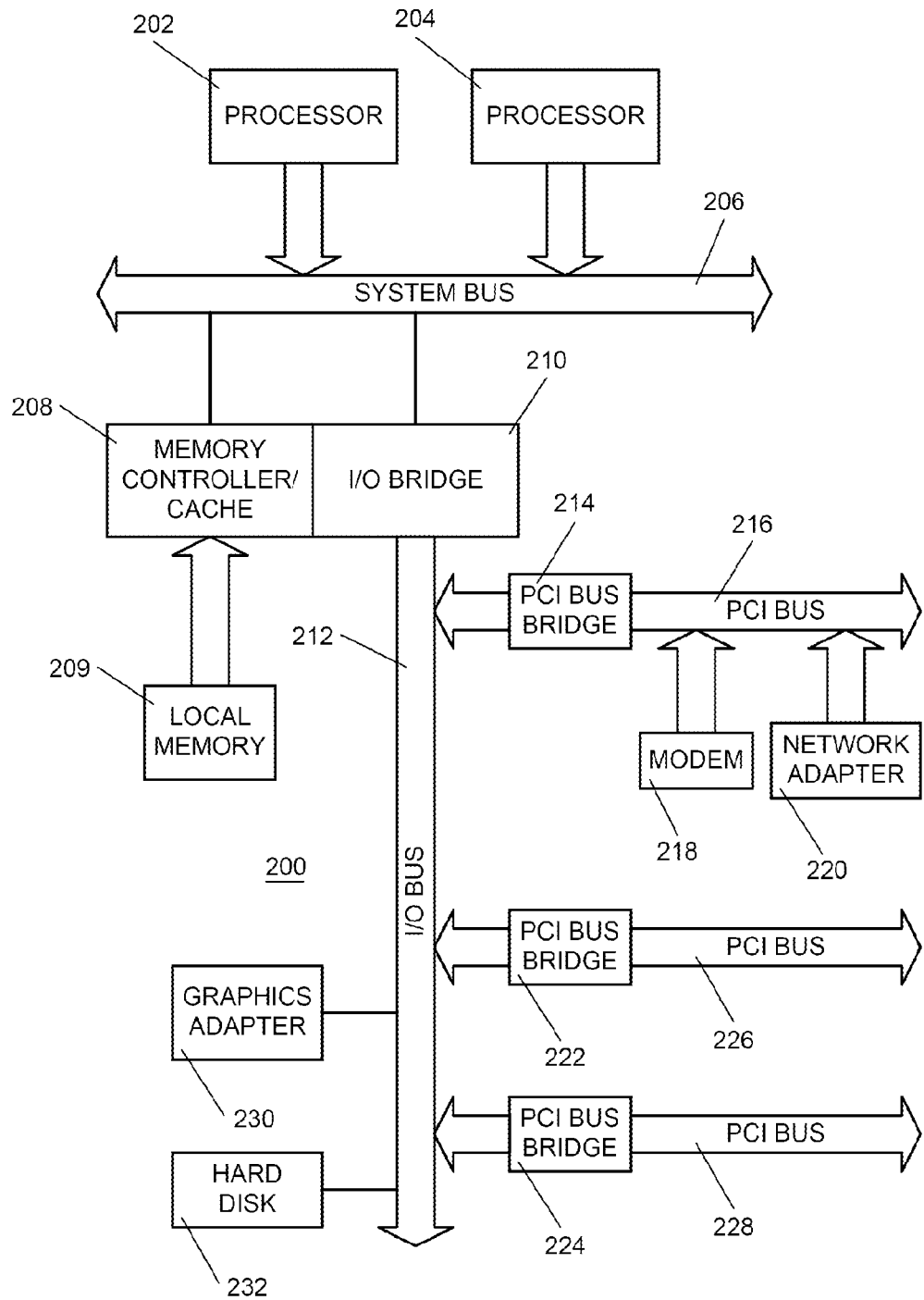
FIG. 2 is a diagram illustrating an exemplary data processing system that can be used to implement elements of the present invention.

Referring to FIG. 2, a block diagram of a data processing system that may be implemented as a server, such as server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable website or other internet-based graphical user interface accessible by users to enable user interaction for aspects of an embodiment of the present invention. In one embodiment, Netscape web server, IBM Websphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical website might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
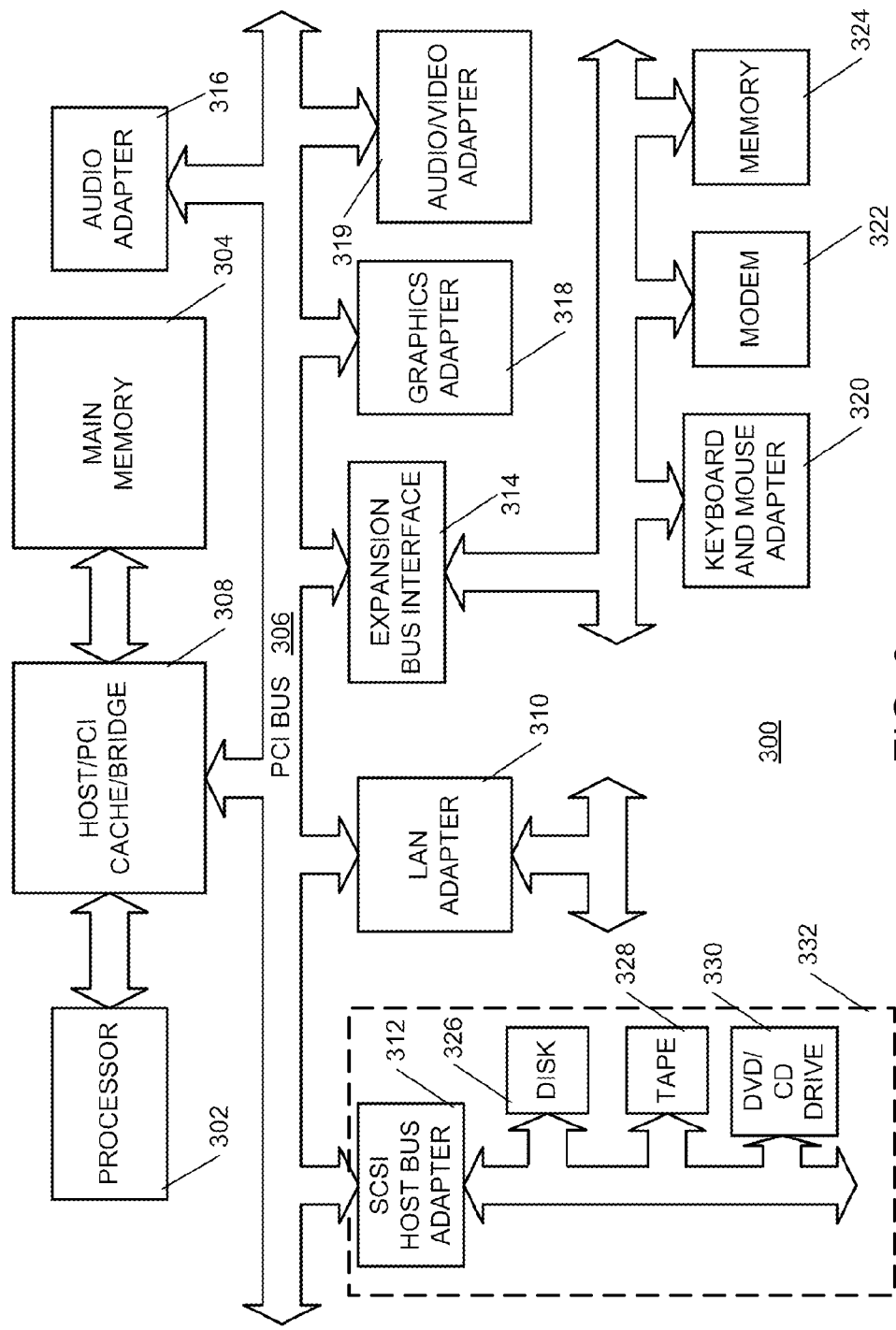
FIG. 3 is a diagram illustrating an exemplary data processing system that can be used to implement elements of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

For example, any type of computer, such as a mainframe, minicomputer, or personal computer, could be used with and for embodiments of the present invention. In addition, many types of applications other than caching applications could benefit from the present invention. Specifically, any application that performs remote access may benefit from the present invention.

Overview

Many enterprise systems (e.g. core banking systems, patient registration systems, sales and servicing applications) are built to actively manage their data. These systems contain various data sources and/or operational applications where different sets of master data are created and maintained. Thus, master data is often widely distributed across multiple enterprise systems and departmental applications. Master data management (MDM) systems or data hubs are designed to validate, store, and manage the data from multiple source systems. Such MDM systems can cleanse, match, link, merge, and semantically reconcile master entities from different data sources to create and maintain a golden entity record (golden record).

It is also important that MDM systems proliferate the golden record back to the data sources and operational applications to improve and maintain the accuracy/quality of the master data within the data sources and operational applications. Without such an accuracy remediation process, sources and applications containing master data that is inconsistent with the golden record will continue to contain poor quality master data. The uncertainties associated with such poor quality, inconsistent master data negatively impacts reliant business processes and decision making.

Figure 4:
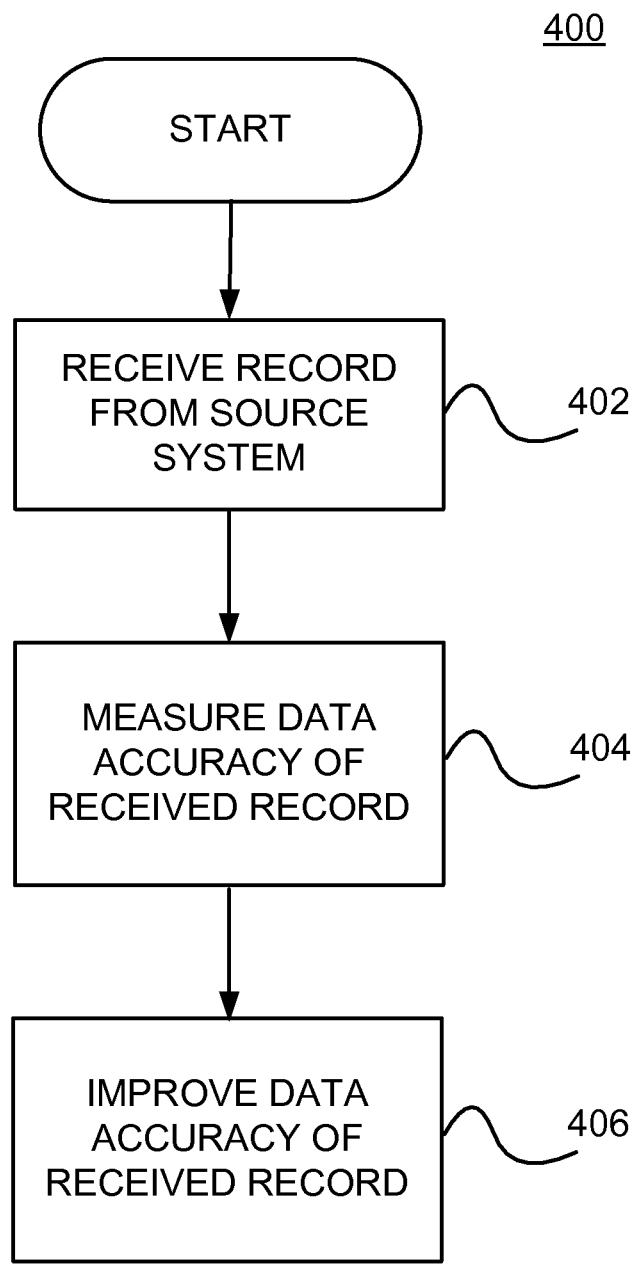
FIG. 4 is a diagram illustrating exemplary process steps that can be used to practice at least one embodiment of the present invention.

The present invention provides systems and methods for measuring, monitoring, and improving the accuracy of source data (i.e. data accuracy), in particular, source system master data. FIG. 4 is a flow chart illustrating exemplary process steps that can be used to practice one or more embodiments of the present invention. In FIG. 4, a computer implemented method 400 is provided for processing data.

In block 402, a record having one or more attributes is received, on one or more computers, from a source system. In one or more embodiments, the record is master data from a source system.

In block 404, the data accuracy of the received record is measured, on one or more computers, as compared to a golden record stored in a master data management system. In one or more embodiments, a probabilistic matching algorithm is used for data quality assessment, which utilizes the golden record as the benchmark (i.e. best approximation to the actual value) for assessing the data accuracy. In further embodiments, measurement of data accuracy comprises calculating, on one or more computers, an accuracy score defined by the closeness of the received record to the golden record. In one exemplary implementation, the accuracy score is calculated by dividing a source-to-golden score by a golden record self-score. The source-to-golden score is computed, on one or more computers, by comparing the received record to the golden record. The golden record self-score is computed, on one or more computers, by matching the golden record on itself. In another embodiment, attributes of the received record are compared to attributes of the golden record while taking into account synonymous values, anonymous values, and the likelihood that some attribute values may be slightly different due to attribute variability. In an exemplary implementation, the accuracy score is calculated for all selected attributes. In further embodiments, attributes of the received record are normalized or standardized. The definition of record accuracy may also be customized for the accuracy score by introducing relative importance weights for different attributes.

In block 406, one or more remediation actions are performed, on one or more computers, to enforce improvements to the measured data accuracy of the received record in the source system. In one or more other embodiments, the computer implemented method comprises generating, on one or more computers, one or more reports on the data accuracy. The detailed reports may be used for accuracy score monitoring. In other embodiments, the computer implemented method comprises monitoring, on one or more computers, the data accuracy of the received record as compared to the golden record over a time period. In exemplary implementations, thresholds for the data accuracy are defined and a data steward for the source system is notified when a received record deviates from the golden record, so that the data steward can perform a remediation action.

Data Accuracy Measurement

In one aspect of the present invention, the system and method measures the accuracy of source system data.

Binary Comparison Algorithms

In one or more embodiments, estimation of the data accuracy or information quality per data element is accomplished through a binary comparison of the attribute value in a data source with the corresponding benchmark value. The binary comparison yields "1" if the values are exactly equal to each other. The binary comparison yields "0" if the compared values are different.

In one or more other embodiments, a slight variation of the binary method is used which includes some simple standardization functions. This addresses possible issues with a strict binary scoring method where even minor deviations in attribute values in the data source compared to the benchmark will result in a data accuracy of "0". For example, if two character strings differ only by leading or trailing zeros, the information governance organization may decide to impose a small penalty on this type of deviation (e.g. 5%) or to not penalize it at all. This type of trivial information quality issues can be systemically addressed at the point of entry. Then there is no need to penalize these issues through data accuracy estimations. The same applies to character case deviations when, for example, the benchmark uses only capitalized characters while data sources use mixed case characters. The binary comparison method or its simple variations are easy to implement.

Probabilistic Matching Algorithms

Figure 5:
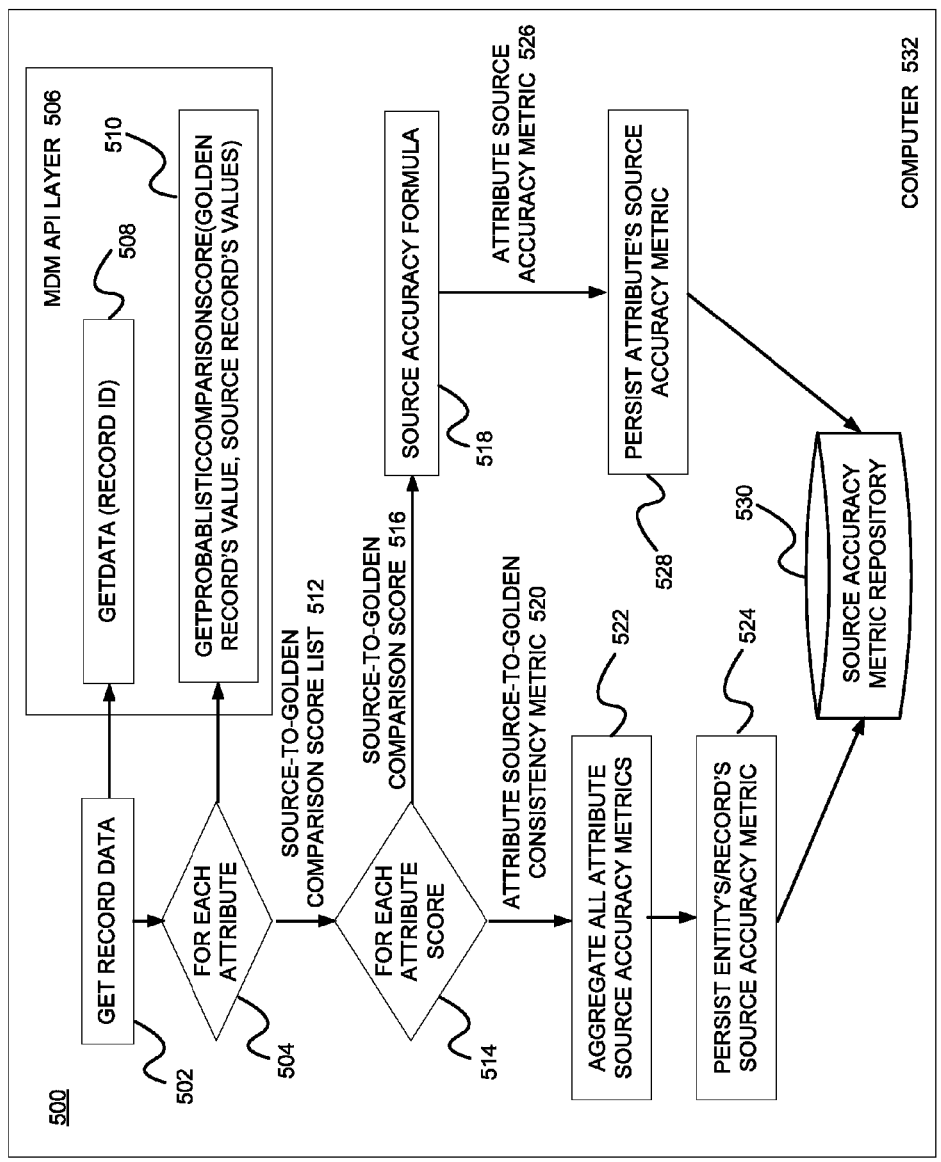
FIG. 5 is a diagram illustrating exemplary process steps for measuring and persisting data accuracy.

In one or more embodiments, measurement of data accuracy comprises calculating, on one or more computers, an accuracy score defined by rating the closeness of the source system record to the golden record. The source accuracy scoring methodology leverages a probabilistic algorithm developed for record matching and applies the algorithm's application programming interfaces (APIs) as illustrated in FIGS. 5 and 6. This probabilistic matching algorithm is used to assess the accuracy and quality of data by considering the golden record as the benchmark.

Probabilistic matching measures the statistical likelihood that two records are the same. By rating the "matchiness" of the two records, the probabilistic method is able to find non-obvious correlations between data. The correlations drawn offer more flexibility in data analysis because they make fewer assumptions about what is right and what is wrong. It takes into account the frequency of data, synonymous values, anonymous values, and a likelihood that some attribute values are slightly different due to attribute variability (e.g. human errors).

In one or more embodiments, the accuracy score is calculated by dividing a source-to-golden score by a golden record self-score. The source-to-golden score is computed, on one or more computers, by comparing the received record to the golden record to determine the level of similarity between the records. Attributes of the received record are compared to attributes of the golden record. In one embodiment, the accuracy score is calculated for all selected attributes. The golden record self-score is computed, on one or more computers, by matching the golden record on itself to determine the level of completeness of the golden record.

One advantage is that the probabilistic matching algorithm is extremely efficient in entity resolution and maintenance. Furthermore, the data accuracy measurement method is aligned with the needs of the matching algorithm. Source data accuracy is improved by leveraging the MDM hub, which makes use of the probabilistic matching algorithm to compare the source data with the golden record. The same algorithm is also used in computing the golden record. Thus, this method provides a standard in how golden records are created and the way source data accuracy is computed.

FIG. 5 illustrates exemplary process steps 500 for measuring and persisting data accuracy on one or more computers 532. In block 502, record data is obtained from a source system. An MDM API layer 506 receives the record data through a GETDATA(RECORD ID) API 508. For each attribute 504 from the record data 502, an accuracy score ("SOURCE-TO-GOLDEN COMPARISON SCORE") is calculated by invoking a Comparison API ("GETPROBABLISTICCOMPARISONSCORE") 510 of a Probabilistic Engine. The self-score of the golden record ("GOLDEN RECORD'S VALUE") and source-to-golden score ("SOURCE RECORD'S VALUES") is passed to the Comparison API 510 as parameters and an accuracy score is provided as an output of the API call.

Furthermore, a source-to-golden comparison score list 512 is created from the source-to-golden scores for each attribute 504. For each attribute score 514 from the score list 512, the source-to-golden comparison score 516 is passed to a source accuracy formula in block 518. The attribute source accuracy metric 526 is calculated using the source accuracy 518 and persisted in block 528. The attribute's source accuracy metric is stored in a source accuracy metric repository 530. Additionally, an attribute source-to-golden consistency metric 520 is determined for each attribute score 514. All the attribute source accuracy metrics are aggregated in block 522 and the entity's/record's source accuracy metric is persisted in block 524, ultimately stored in a source accuracy metric repository 530.

FIG. 6 is an illustrative example of data accuracy calculations using the probabilistic matching algorithm. For example, the golden record self-score for "WILLIAM SMITH" is 3.0. In this scenario an exact match for the name "WILLIAM SMITH" is scored to 3.0. This is an internal probabilistic score that the MDM system assigns for a match based on various factors such as weight, frequency, etc. In one example, the match score can vary based on the frequency of a name. Assuming "John" is a common name, an exact match of the name may have a lower score (e.g. 1.0). If "Jouan" is a rare name, then an exact match for "Jouan" may have a higher score (e.g. 7.0). In addition to this, there are many other factors that the MDM probabilistic matching engine takes into account while assigning a score.

A source record with the value "WILLIAM SMITH" is an exact match and thus also has a source-to-golden score ("SOURCE-TO-GOLDEN COMPARISON SCORE") of 3.0. Dividing this source-to-golden score by the golden record self-score gives an accuracy score of 1. Multiplying the accuracy score by 100% gives an accuracy score percentage ("SOURCE ACCURACY %") of 100%. A source record with the value "WILLIAM SMYTH" has a character off and thus only has a source-to-golden score of 2.2. Using the same formula, the accuracy score percentage is calculated to only be 73.3%. Furthermore, an average accuracy may be calculated for the source records (48.66%).

Additionally, the probabilistic matching algorithm provides scores in a range that may be configured to be between a positive number and a negative number. If it cannot relate two data elements by any logic then it provides negative score. This scoring behavior for maximum and minimum scores can be configured depending on the needs of the user. In FIG. 6, the source record "BILL JAMES" is an incorrect name and thus is given a negative source-to-golden score. This results in a negative accuracy score percentage (−10%). The source record "Baby Girl" is an anonymous/null value and thus is a 0% match.

FIG. 7 shows illustrative examples of determining record similarity for source-to-golden scoring and record completeness for golden record self-scoring. For example, record 702 for "JOHN SMITH" represents the golden record. The source record 704 of "J. SMITH" is matched to the golden record to determine the level of similarity. A source-to-golden score of 7.7 is calculated since the two records contain various inconsistencies, such as the abbreviation of the name ("JOHN SMITH" vs. "J. SMITH"), the different street number ("12 MAIN ST." vs. "18 MAIN STREET"), and the different format of the phone number ("(609) 123-4567" vs. "609-123-4567").

Generally, the golden record self-score is determined by matching the golden record against itself and measuring the completeness of the golden record. In some cases, when computing the golden record self-score, two records may be used even though the comparison is against itself. This is because even though the data is the same, the gold record self-score may not be perfect or 100% complete if data values are missing and the gold record is incomplete. Hence, determination of the gold record self-score is still very important when calculating data accuracy. For example, comparing the golden record 702 of "JOHN SMITH" to itself yields a golden record self-score of 9.9 since the record is complete with all of the information and only has a slight difference in the abbreviation for "ST." However, comparing the golden record "B. JONES" to itself only yields a golden record self-score of 6.2 since golden record is incomplete with the phone number is missing.

Different Score Weighting for Accuracy Calculations

In one or more embodiments, the definition of record accuracy can be customized for the accuracy score by introducing relative importance weights for different attributes. Some information may be more important to the user than other information and thus the relative significance of each attribute to the record accuracy is taken into account by using attribute weights. In certain embodiments, the computer implemented method comprises normalizing or standardizing, on one or more computers, attributes of the received record.

Figure 8A:
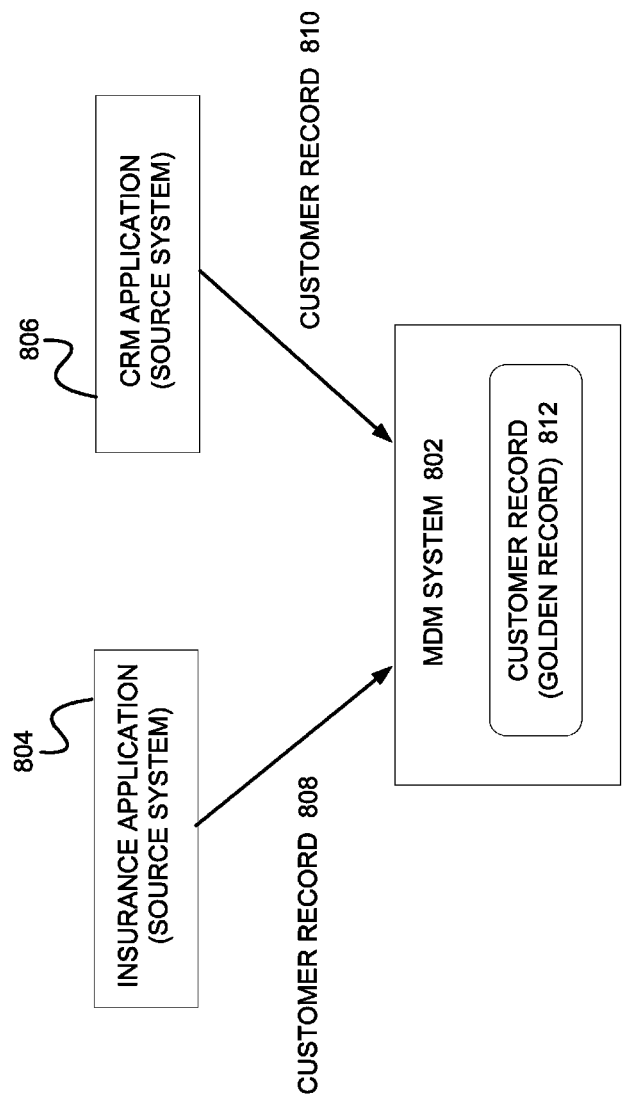
FIG. 8A is a diagram illustrating an exemplary relationship between source systems and the master data management (MDM) system.
Figure 8B:
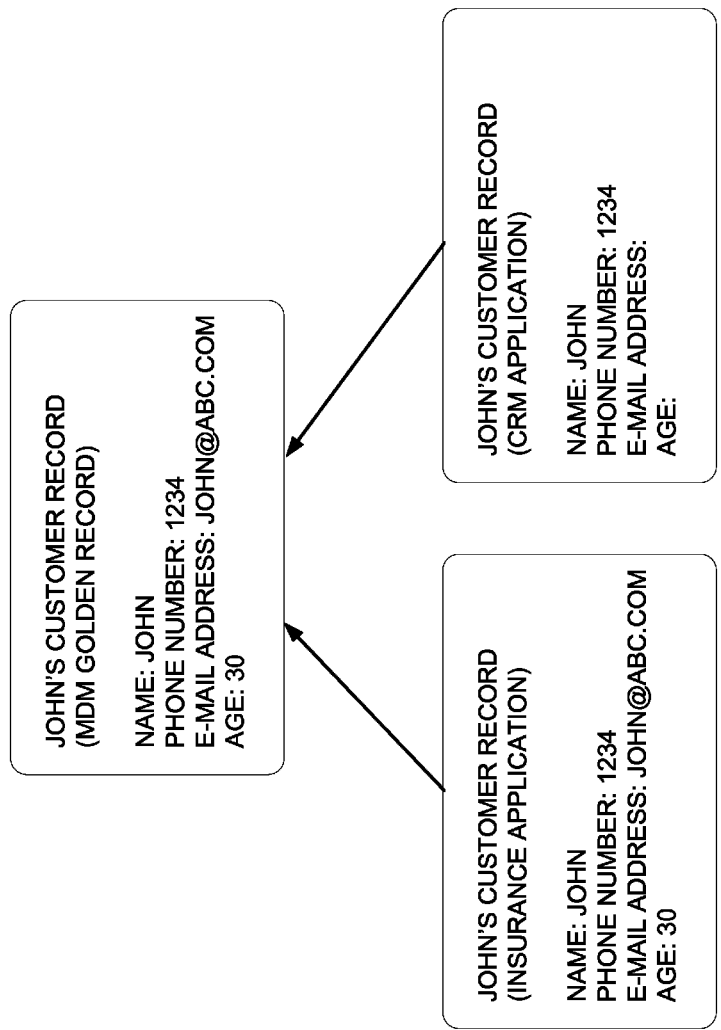
FIG. 8B is a diagram illustrating exemplary differences in data accuracy between the master records from different source systems and the golden record from the master data management (MDM) system.

FIG. 8A-C are illustrative examples of an MDM system 802 managing customer records 808 and 810 from two source systems, insurance application 804 and customer relationship management (CRM) application 806. In one example, as shown in FIG. 8B, John's customer records found separately in the insurance application and the CRM application are compared to the MDM golden record of John's customer record. Notably, John's customer record in the CRM application does not have a value for the "E-Mail Address" or the "Age" fields. However, as shown in FIG. 8C, the attributes for the records in the insurance application and the CRM application are given different weights. The CRM application is less concerned with the age of the customer and thus places less weight for the "Age" field than the similar "Age" field for the Insurance application.

In one or more other embodiments, determination of record accuracy includes penalizing severe information quality issues while imposing smaller penalties on less significant information quality issues. This takes into account the important specifics expected when comparing attribute values for the purpose of information quality. For each data element, there are different levels of information quality issues ranging from cosmetic differences to missing and even totally incorrect values. The importance, significance and therefore the information penalty that is to be incurred depends on the nature of information quality issue. Often, the severity of information quality issues depends on the usage.

As an illustrative example, an attribute "Name" has a benchmark value of "WILLIAM SMITH". There are five matching customer records (A through E) with the following values for the attribute "Name":

A: "WILLIAM SMITH"
B: "B. SMITH"
C: "WILLIAM SMYTH"
D: "NAME UNKNOWN"
E: "JAMES WILLIAMS"

It is assumed that the five data source records A-E share the same enterprise identifier with the benchmark record in the trusted source, e.g. a Party data hub. It is also assumed that even for scenarios D and E where the names differ significantly from the benchmark, there exists enough similarity in other matching attributes (e.g. address, phone number, email, social security number) to match and link the records with a common identifier.

Even though only value A is absolutely correct and should score 100% in information quality/data accuracy, scenarios B-E illustrate different levels of deviation from the benchmark value "WILLIAM SMITH". From the common sense perspective, in scenario B the value is, generally speaking, right except the first name is incomplete and the nickname "Bill" is implied. In scenario C, the last name is incorrect but only one character is off. Scenario D does not really contain any name. The name is replaced with an anonymous value "NAME UNKNOWN". Finally, scenario E displays a totally incorrect name that seems to belong to another person. This scenario is a little extreme but this type of mismatch can occur in practice for instance if all other attributes on the record happen to be consistent with WILLIAM SMITH's records.

Scenarios B-E are all incorrect in comparison with the golden record for the attribute "Name". However, the severities of the inaccuracies are different and thus different penalties are assessed, which results in different accuracy scores for each scenario. For example, the inaccuracy in scenario B, which uses the nickname "Bill" for the first name instead of the formal name "William", is penalized much less than the inaccuracy in scenario D or E, which has an absent or completely incorrect name.

Data Accuracy Monitoring

In another aspect of the present invention, the system and method monitors the accuracy of source system data. A computer implemented method comprises monitoring, on one or more computers, the data accuracy of the received record as compared to the golden record over a time period. In one or more embodiments, thresholds for the data accuracy are defined, for example, by a data governance organization. A data steward for the source system is automatically notified when a received record that they steward deviates from the golden record. The data steward is further prompted to perform corrective or remediation actions.

In one or more other embodiments, the computer implemented method comprises generating, on one or more computers, one or more reports on the data accuracy. The detailed reports are provided for accuracy score monitoring. In an exemplary implementation, source accuracy is calculated for all the entity attributes selected by a user. This information is presented in reports where the user can drill down to specific levels (e.g. attribute level, record level, system specific level) to obtain accuracy information. Source accuracy trends are also reported, which enables a data governance organization or user to understand the evolution of source data accuracy.

Figure 9:
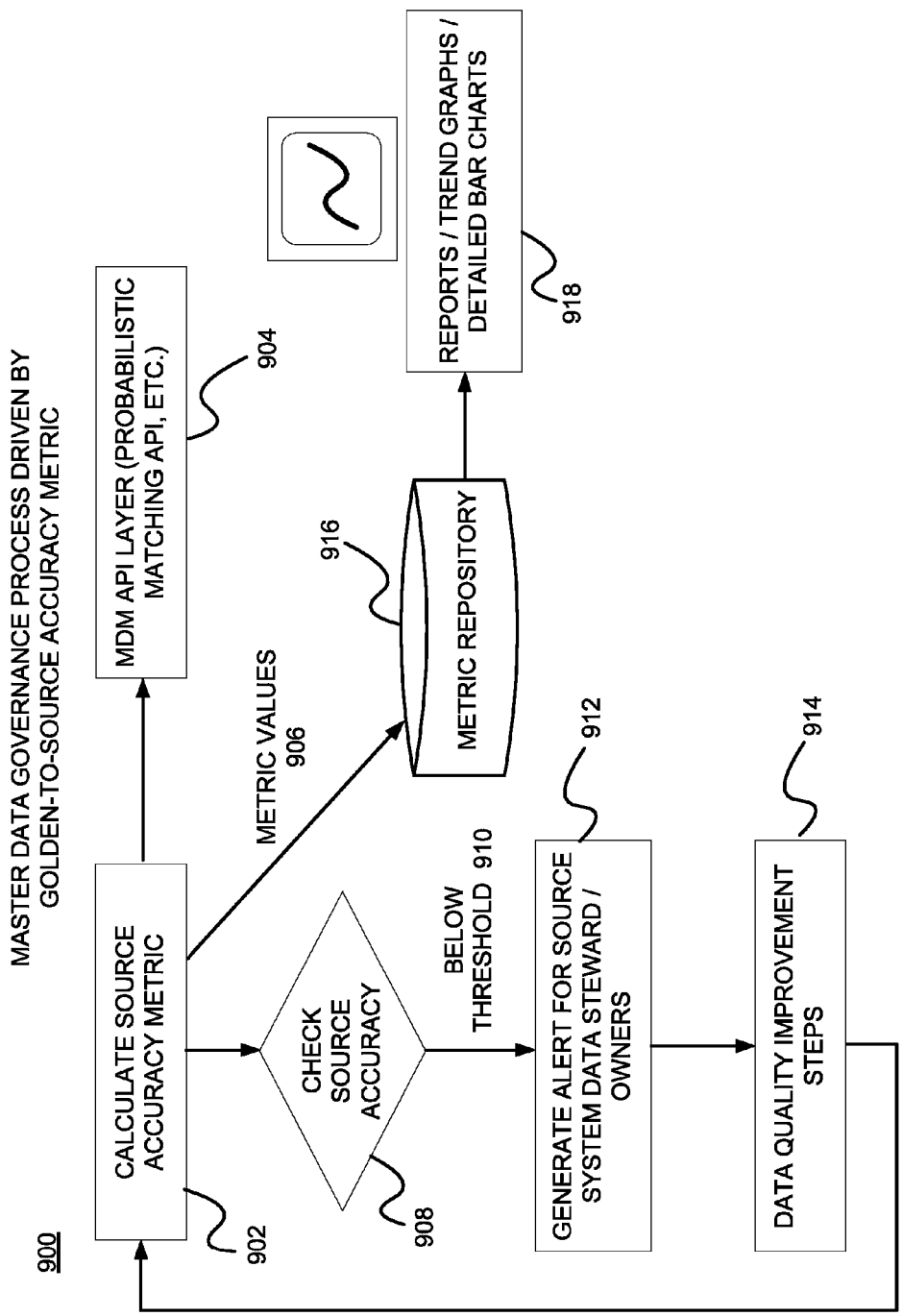
FIG. 9 is a diagram illustrating exemplary process steps for monitoring data accuracy and generating reports on the data accuracy.

FIG. 9 illustrates exemplary process steps 900 for monitoring source accuracy. In block 902, a source accuracy metric or accuracy score is calculated. The accuracy score is provided to an MDM API layer 904, such as a probabilistic matching API, etc. The accuracy score is also used to check the source accuracy in block 908. If the source accuracy is determined to fall below a threshold 910, an alert is generated for the source system data steward in block 912. Data quality improvement steps are taken in block 914 to address the issue and the above steps are repeated. The metric values 906 of the accuracy score are also stored in a metric repository 916 which is used to generate reports 918, such as trend graphs, and detailed bar charts.

Figure 10:
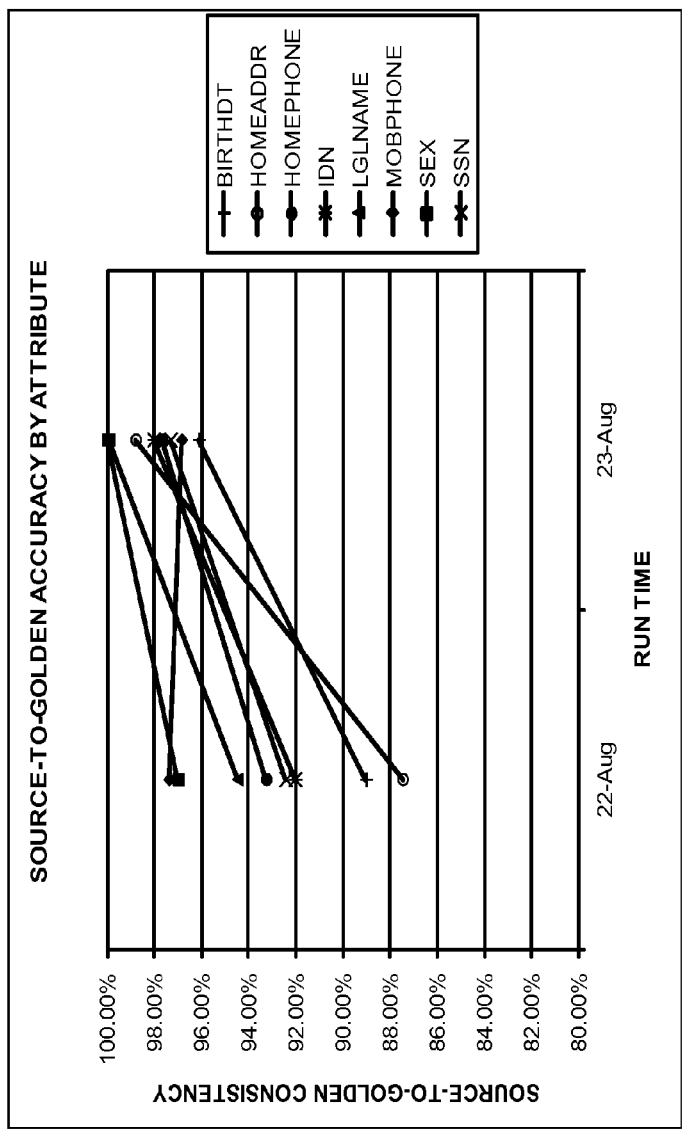
FIG. 10 is a diagram illustrating an exemplary report of the data accuracy of different attributes of source system records.

FIGS. 10 and 11 illustrate exemplary reports of the data accuracy of different attributes of source system records. The accuracy score individual attributes (e.g. "BIRTHDT", "HOMEADDR") are measured at two separate times. FIG. 10(A) is a table showing the data accuracy of the individual attributes. By plotting the accuracy score over time in FIG. 10(B), a trend of increased source-to-golden data consistency can be seen. FIG. 11 is another example report showing the specific source-to-golden scores ("MEMBER TO ENTITY SCORE") and gold record self-scores ("ENTITY SELF SCORE") for each record. For example, Entity ID 604 has a source/member value that is different from the golden/entity value ("^808^164-9747^^^" vs. "^808^169-4747^^^") and thus has a member to entity score of 24. Entity ID 4768 is missing a source/member value and thus has a member to entity score of 0.

Data Accuracy Improvement

In a further aspect of the present invention, the system and method improves the accuracy of source system data by comparing the source system data's closeness to the golden record and feeding the golden record back to the source system. The system and method leverages the notion that the golden record represents the enterprise truth (or the most accurate representation/approximation) for master data. The data accuracy improvement process measures the accuracy of data in the source systems utilizing the golden record and performs remediation actions to improve the accuracy of data in the source systems. This enables organizations to improve the accuracy of data in enterprise data sources and applications. The source accuracy score is defined by rating the individual source system data against the golden record and come up with a method to govern the data improvement process in the source system. This in turn improves the golden record, through a reduction and elimination of variances in the source systems.

In the remediation process, the golden record may be sent to the source system to update the source system data without impacting source applications. If the source system has data/attributes that cannot be updated (e.g. source data is part of a key that cannot be modified), such data/attributes may still be monitored but assigned lower weights so that the overall accuracy score is not impacted and falls below a threshold.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for processing data, comprising:

receiving, on one or more computers, a record having one or more attributes from a source system;

measuring, on one or more computers, a data accuracy of the received record as compared to a golden record stored in a master data management system, wherein measuring the data accuracy of the received record comprises calculating an accuracy score defined by a closeness of the received record to the golden record, the accuracy score calculated by:

computing, on one or more computers, a golden record self-score by matching the golden record on itself;

computing, on one or more computers, a source-to-golden score by comparing the received record to the golden record; and computing, on one or more computers, the accuracy score by dividing the source-to-golden score by the golden record self-score; and performing, on one or more computers, one or more remediation actions enforcing improvements to the measured data accuracy of the received record in the source system.

2. The method of claim 1, wherein the step of comparing the received record to the golden record comprises comparing attributes of the received record to attributes of the golden record.

3. The method of claim 2, wherein the step of comparing the attributes of the received record to the attributes of the golden record takes into account synonymous values, anonymous values, and a likelihood that some attribute values are slightly different due to attribute variability.

4. The method of claim 1, wherein the step of calculating the accuracy score further comprises customizing, on one or more computers, a definition of record accuracy by introducing relative importance weights for different attributes.

5. The method of claim 1, further comprising the step of monitoring, on one or more computers, the data accuracy of the received record as compared to the golden record over a time period.

6. A computer implemented apparatus for processing data, comprising:

one or more computers; and one or more processes performed by the one or more computers, the processes configured to:

receive, on one or more computers, a record having one or more attributes from a source system;

measure, on one or more computers, a data accuracy of the received record as compared to a golden record stored in a master data management system, wherein measurement of the data accuracy of the received record comprises calculating an accuracy score defined by a closeness of the received record to the golden record, the accuracy score calculated by:

computing, on one or more computers, a golden record self-score by matching the golden record on itself;

computing, on one or more computers, a source-to-golden score by comparing the received record to the golden record; and computing, on one or more computers, the accuracy score by dividing the source-to-golden score by the golden record self-score; and perform, on one or more computers, one or more remediation actions enforcing improvements to the measured data accuracy of the received record in the source system.

7. The apparatus of claim 6, wherein comparing the received record to the golden record comprises comparing attributes of the received record to attributes of the golden record.

8. The apparatus of claim 7, wherein comparing the attributes of the received record to the attributes of the golden record takes into account synonymous values, anonymous values, and a likelihood that some attribute values are slightly different due to attribute variability.

9. The apparatus of claim 6, wherein calculating the accuracy score further comprises customizing, on one or more computers, a definition of record accuracy by introducing relative importance weights for different attributes.

10. The apparatus of claim 6, wherein the processes are further configured to monitor, on one or more computers, the data accuracy of the received record as compared to the golden record over a time period.

11. A computer program product for processing data, said computer program product comprising:

a computer readable storage medium having stored or encoded thereon:

first program instructions executable by a computer to cause the computer to receive, on one or more computers, a record having one or more attributes from a source system;

second program instructions executable by the computer to cause the computer to measure, on one or more computers, a data accuracy of the received record as compared to a golden record stored in a master data management system, wherein measurement of the data accuracy of the received record comprises calculating an accuracy score defined by a closeness of the received record to the golden record, the accuracy score calculated by:

computing, on one or more computers, a golden record self-score by matching the golden record on itself;

computing, on one or more computers, a source-to-golden score by comparing the received record to the golden record; and computing, on one or more computers, the accuracy score by dividing the source-to-golden score by the golden record self-score; and third program instructions executable by the computer to cause the computer to perform, on one or more computers, one or more remediation actions enforcing improvements to the measured data accuracy of the received record in the source system.

12. The computer program product of claim 11, wherein comparing the received record to the golden record comprises comparing attributes of the received record to attributes of the golden record.

13. The computer program product of claim 12, wherein comparing the attributes of the received record to the attributes of the golden record takes into account synonymous values, anonymous values, and a likelihood that some attribute values are slightly different due to attribute variability.

14. The computer program product of claim 11, wherein calculating the accuracy score further comprises customizing, on one or more computers, a definition of record accuracy by introducing relative importance weights for different attributes.

\* \* \* \* \*